United States Patent
Omid-Zohoor et al.

(10) Patent No.: US 12,499,916 B2
(45) Date of Patent: Dec. 16, 2025

(54) METHOD AND SYSTEM FOR TRAINING AN ATHLETIC MOTION BY AN INDIVIDUAL

(71) Applicant: PG Tech, LLC, Scottsdale, AZ (US)

(72) Inventors: Alex B. Omid-Zohoor, Scottsdale, AZ (US); Tarek Abdelghany, Scottsdale, AZ (US); Jason Bautista, Scottsdale, AZ (US); Kyle Crawford, Scottsdale, AZ (US); Brad Reyes, Scottsdale, AZ (US); Joseph Zoller, Scottsdale, AZ (US); Mason Mullally, Scottsdale, AZ (US)

(*) Notice: Subject to any disclaimer, the term of this patent is extended or adjusted under 35 U.S.C. 154(b) by 0 days.

(21) Appl. No.: 18/281,886

(22) PCT Filed: Mar. 17, 2022

(86) PCT No.: PCT/US2022/020765
§ 371 (c)(1),
(2) Date: Sep. 13, 2023

(87) PCT Pub. No.: WO2022/197932
PCT Pub. Date: Sep. 22, 2022

(65) Prior Publication Data
US 2024/0153539 A1 May 9, 2024

Related U.S. Application Data

(60) Provisional application No. 63/162,911, filed on Mar. 18, 2021.

(51) Int. Cl.
G11B 27/36 (2006.01)
G09B 19/00 (2006.01)
G11B 27/10 (2006.01)
H04N 5/272 (2006.01)
H04N 5/91 (2006.01)

(52) U.S. Cl.
CPC .......... G11B 27/36 (2013.01); G09B 19/0038 (2013.01); G11B 27/10 (2013.01); H04N 5/272 (2013.01); H04N 5/91 (2013.01)

(58) Field of Classification Search
CPC .... G06V 40/23; G09B 19/0038; G11B 27/10; G11B 27/36; H04N 5/272; H04N 5/91
USPC .......... 386/201, 200, 207, 239, 248
See application file for complete search history.

(56) References Cited

U.S. PATENT DOCUMENTS

| | | |
|---|---|---|
| 5,241,428 A | 8/1993 | Goldwasser et al. |
| 11,948,097 B1 * | 4/2024 | Stark .................. G06N 20/00 |
| 2003/0156113 A1 * | 8/2003 | Freedman ............ G11B 27/11 |
| | | 345/473 |
| 2015/0138243 A1 * | 5/2015 | Lin ..................... G06T 7/70 |
| | | 345/659 |
| 2016/0049089 A1 | 2/2016 | Witt |
| 2016/0345043 A1 | 11/2016 | Feldman et al. |

(Continued)

Primary Examiner — Daquan Zhao
(74) Attorney, Agent, or Firm — Dentons US LLP; Derek A Auito

(57) ABSTRACT

According to an embodiment of the disclosure, there is provided a method that includes displaying a video with audio and/or visual cues that allow an individual to match timing with a predetermined movement, obtaining a video signal of the individual performing the predetermined movement, synchronizing the recorded video of the individual with a video of the predetermined movement, and displaying the recorded video with the predetermined video for a side-by-side review.

8 Claims, 18 Drawing Sheets

(56) References Cited

U.S. PATENT DOCUMENTS

2018/0357472 A1   12/2018   Dreessen
2020/0162784 A1    5/2020   Madison et al.
2020/0222757 A1    7/2020   Yang
2020/0314489 A1   10/2020   Thielen et al.
2021/0044867 A1*  2/2021   Butters .............. H04N 21/4302

* cited by examiner

METHOD AND SYSTEM FOR TRAINING AN ATHLETIC MOTION BY AN INDIVIDUAL

RELATED APPLICATION

This application is the National Stage filing under 35 U.S.C. § 371 of International Application No. PCT/US2022/20765, filed on Mar. 17, 2022, which claims the benefit of U.S. provisional patent application No. 63/162,911 filed Mar. 18, 2021, the entire content of which is incorporated by reference herein.

FIELD OF THE DISCLOSURE

The present disclosure relates generally to a multi-function method and system for training an athletic motion.

BACKGROUND

The present disclosure relates to a system, method and apparatus for assessing and training a swing, providing analysis of the swing and providing feedback to a player.

Prior art swing measuring devices do not provide sufficient precision and appropriate and timely feedback to the player. For example, dynamic movements like a swing involve a series of postures performed over a window of time. In order to accurately compare the form of one player's swing to another player's swing, it is important to look at the postures at the same point in the swing (e.g., ball impact). Prior art swing measuring devices capture video of a given player's swing. However in order to compare video of one player's swing to that of another player's swing one would, among other things, manually scrub through two videos to synch them up.

There exists a need for automatic time-syncing of swing videos so that the manual step of aligning is removed and precision is achieved. There also exists a need for providing instant feedback to the players since the videos are already synched up automatically.

SUMMARY OF THE DISCLOSURE

The following presents a general summary of example aspects to provide a basic understanding of example embodiments. This summary is not an extensive overview. It is not intended to identify key or critical elements or to delineate scope of the disclosure. The following summary merely presents some concepts of the disclosure in a general form as a prelude to a more detailed description provided below.

According to an embodiment, there is provided a method for execution by a client device. The method involves playing a pre-recorded video of an expert performing an athletic motion having a plurality of defined motion stages. The method also involves, during each defined motion stage of the athletic motion being played, generating a perceptible cue conveying progress of the defined motion stage. The perceptible cues can make it easier for an individual to learn and practice the athletic motion.

According to another embodiment, there is provided a non-transitory computer readable medium having recorded thereon statements and instructions that, when executed by a processor of a client device, configure the client device to implement the method summarized above.

According to another embodiment, there is provided a client device. The client device has a network adapter, a display, and a camera. The client device also has video circuitry that is coupled to the network adapter, the display, and the camera, and configured to implement the method summarized above.

According to another embodiment, there is provided a method for execution by a client device. The method involves repeatedly playing a pre-recorded video for a plurality of repetitions, the pre-recorded video having first content. The method also involves recording a newly recorded video concurrently with the repeatedly playing of the pre-recorded video such that the newly recorded video is a single continuous recording during all of the repetitions of the playing of the pre-recorded video, the single continuous recording having second content related to the first content. The repeatedly playing of the pre-recorded video while the single continuous recording is being recorded involves a variable latency before each instance the pre-recorded video is played. Therefore, the method also involves measuring each variable latency, and executing playback review by repeatedly playing back the first content for the repetitions simultaneously with playback of the second content in a manner that synchronises the repeatedly playing back of the first content with the playback of the second content by accounting for each variable latency that has been measured. The synchronisation can make it easier for an individual to visually compare the first content and the second content during the playback review.

According to another embodiment, there is provided a non-transitory computer readable medium having recorded thereon statements and instructions that, when executed by a processor of a client device, configure the client device to implement the method summarised above.

According to another embodiment, there is provided a client device. The client device has a network adapter, a display, and a camera. The client device also has video circuitry that is coupled to the network adapter, the display, and the camera, and configured to implement the method summarized above.

According to another embodiment, there is provided a method for execution by a server. The method involves storing a pre-recorded video comprising first content. The method also involves receiving, from a client device, a single continuous recording of second content related to the first content, and timing information based on (i) an initial time offset between when recording of the single continuous recording began and when playing of the pre-recorded video began for a first instance, and (ii) for each subsequent instance that the pre-recorded video was played, a time delay to start the subsequent instance after completing a previous instance. The method also involves generating a rendered video having a rendered combination of the single continuous recording and multiple repetitions of the pre-recorded video corresponding to how many instances the pre-recorded video was played, such that, at a beginning of each repetition of the pre-recorded video in the rendered combination, the single continuous recording is at a time marker associated with that repetition. The method also involves sending, to the client device, the rendered video. The rendering performed by the server can make it possible to perform functions such as blending or superimposing without tasking the client device with excessive computation.

According to another embodiment, there is provided a non-transitory computer readable medium having recorded thereon statements and instructions that, when executed by a processor of a server, configure the server to implement the method summarized above.

According to another embodiment, there is provided a server. The server has a network adapter, and video circuitry that is coupled to the network adapter and configured to implement the method summarized above.

One or more aspects describe systems, methods and apparatuses for tracking performance metrics of a user during an exercise session, such as swinging an instrument such as a baseball bat, golf club, tennis racket, badminton racket, etc., that are swung in a three-dimensional (3D) space.

In some example aspects, the systems, methods and apparatuses may include displaying a video with audio and/or visual cues that allow an individual to match timing with a predetermined movement, obtaining a video signal of the individual performing the predetermined movement, synchronizing the recorded video of the individual with a video of the predetermined movement, and displaying the recorded video with the predetermined video for a side-by-side review.

In some example aspects, the systems, methods and apparatuses may include a predetermined video that is a video of an expert or professional performing the predetermined movement.

In some example aspects, the systems, methods and apparatuses may include displaying timing cues to a user at the time the video of the swing is recorded.

In some example aspects, the systems, methods and apparatuses provide instant feedback to the user since the videos are synched up automatically.

In some example aspects, the systems, methods and apparatuses are configured to use computer vision to detect body or hand gestures from the user.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

INTRODUCTION

Figure 1:
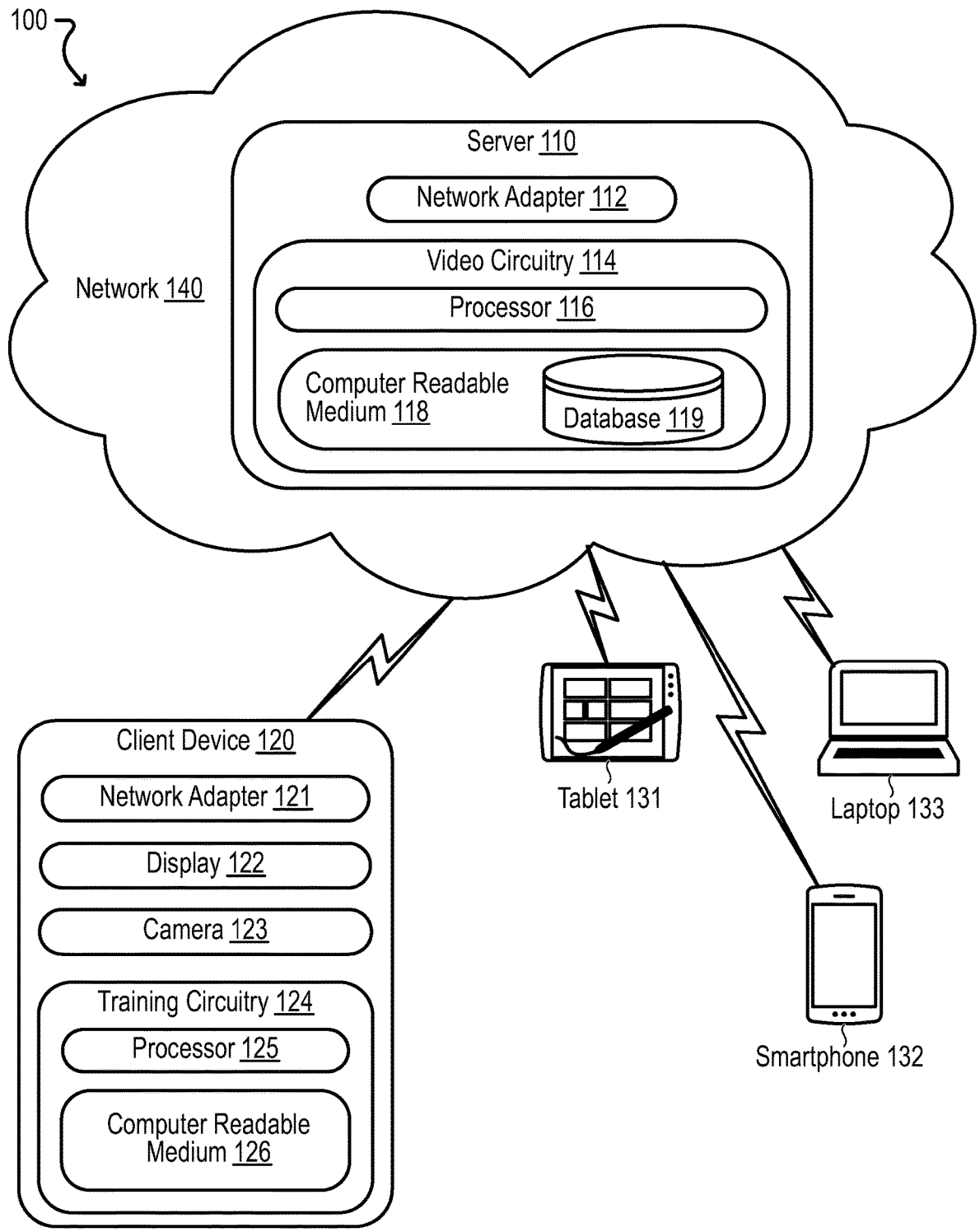
FIG. 1 is a block diagram of an example communication system having a client device coupled to a server.

Referring first to FIG. 1, shown is a block diagram of an example communication system 100 having a client device 120 coupled to a server 110 via a network 140. The communication system 100 can have numerous other client devices 131-133 of varying types as well, although only a few of them are shown. Some of the other client devices 131-133 can have similar configuration as the client device 120, although details of such configuration are not shown. The communication system 100 can have other components as well, but these are not shown for simplicity.

The client device 120 has a network adapter 121 for communicating with the server 110 over the network 140, a display 122, and a camera 123. The client device 120 also has training circuitry 124 configured to assist an individual to learn and practice an athletic motion as described in further detail below. Additionally, or alternatively, the training circuitry 124 is configured to perform video synchronisation as described in further detail below. In some implementations, the training circuitry 124 includes a processor 125 that executes software, which can stem from a computer readable medium 126. However, more generally, the training circuitry 124 can be implemented with any suitable combination of hardware, software and/or firmware. Also, the client device 120 can have additional components, but these are not shown for simplicity.

The server 110 has a network adapter 112 for communicating with the client devices 120 and 131-133 over the network 140, and video circuitry 114 that can operate in collaboration with the training circuitry 124 of the client device 120 as described in further detail below. In some implementations, the video circuitry 114 includes a processor 116 that executes software, which can stem from a computer readable medium 118. However, more generally, the video circuitry 114 can be implemented with any suitable combination of hardware, software and/or firmware. Also, the server 110 can have additional components, but these are not shown for simplicity.

Figure 2:
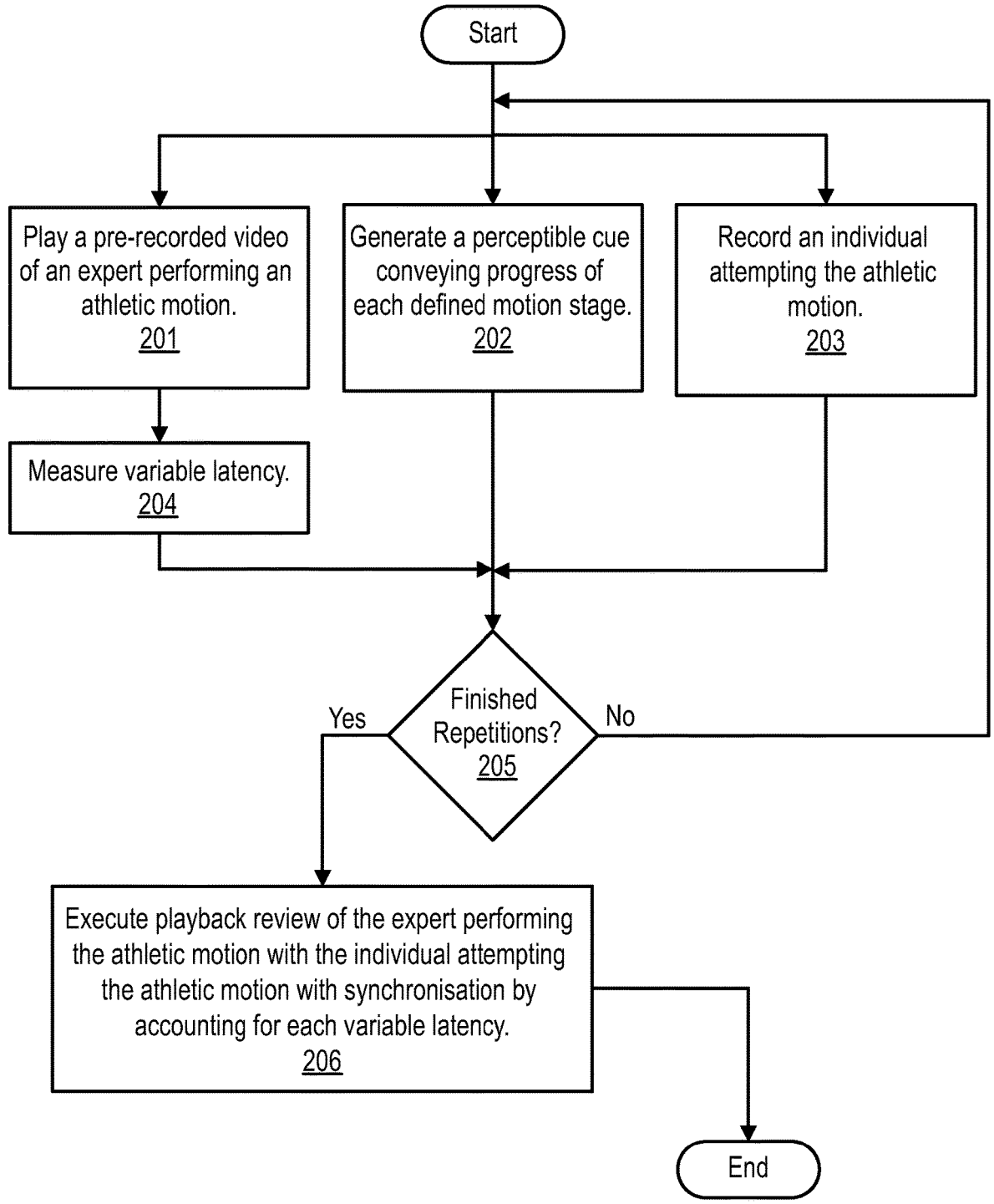
FIG. 2 is a flowchart of a method of assisting an individual to learn and practice an athletic motion.

Operation of the training circuitry 124 of the client device 120 will be described below with reference to FIG. 2, which is a flowchart of a method of assisting an individual to learn and practice an athletic motion. Although the method of FIG. 2 is described below with reference to the client device 120 in the communication system 100 shown in FIG. 1, it is to be understood that the method of FIG. 2 is applicable to other systems. In general, the method of FIG. 2 is applicable to the client device 120 in any appropriately configured system.

At step 201, the client device 120 plays a pre-recorded video of an expert or trainer performing an athletic motion having a plurality of defined motion stages. At the same time, at step 202, during each defined motion stage of the athletic motion being played, the client device 120 generates a perceptible cue conveying progress of the defined motion stage. The perceptible cues can make it easier for an individual to learn and practice the athletic motion while the pre-recorded video is being played.

In some implementations, at step 203 the client device 120 captures the individual attempting the athletic motion. This can be done for example to display the individual in real-time concurrently with the pre-recorded video at step 201 and the perceptible cue at step 202. Additionally, or alternatively, the recording of the individual attempting the athletic motion can be done to later execute playback review as described below for step 206.

A specific example of steps 201 to 203 is provided below with reference to FIGS. 3A to 3C for an athletic motion of swinging an instrument such as a baseball bat. It is to be understood that the invention applies to any instrument that can be swung in a three-dimensional (3D) space, such as a golf club, tennis racket, badminton racket, etc., and is not limited to a baseball bat. It is to be further understood that the method is applicable to any athletic motion having plurality of defined motion stages. Other possible athletic motions include swinging a golf club, throwing a ball, kicking a ball, swinging a tennis racket, etc.

Figure 3A:
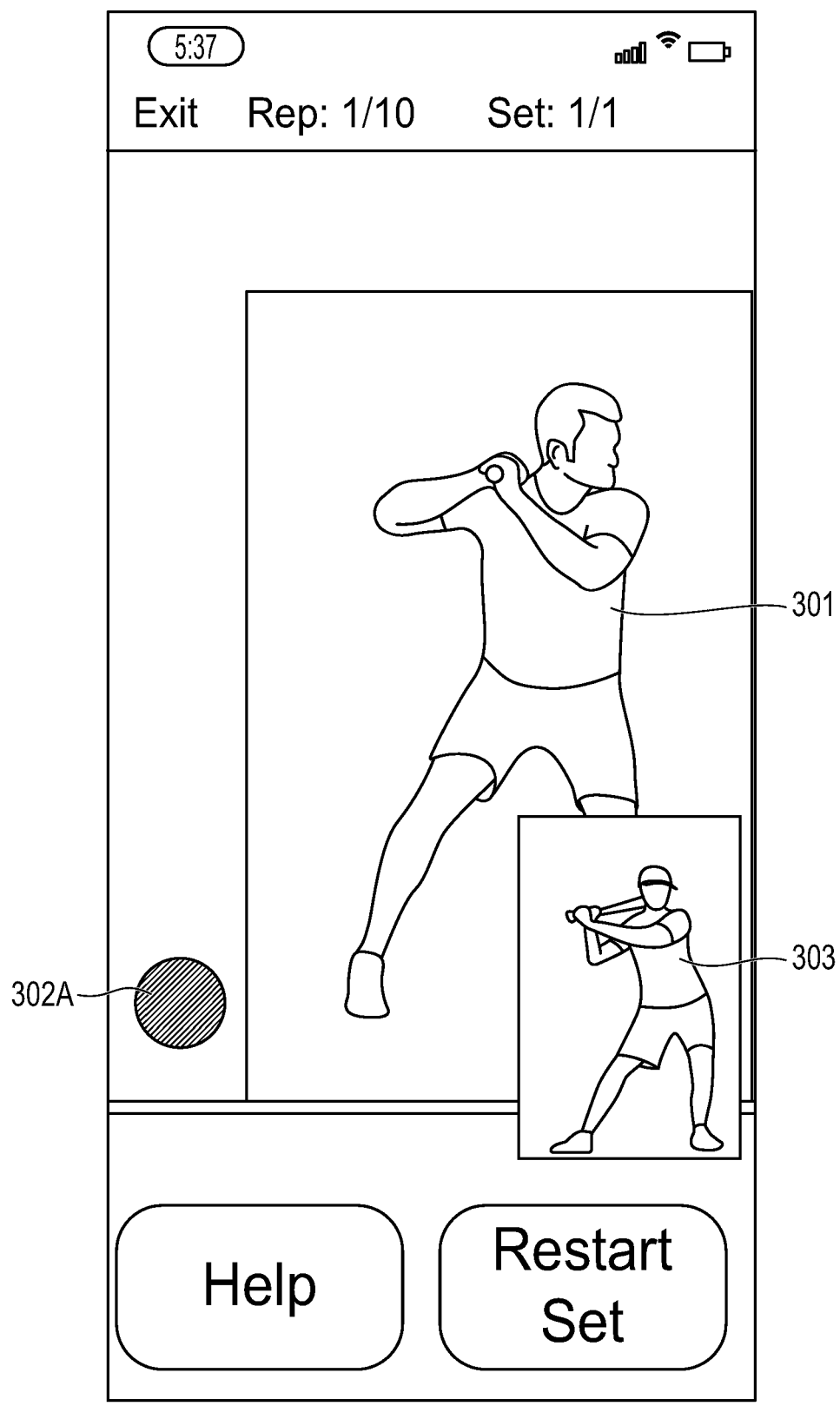
FIGS. 3A to 3C are screenshots of an expert executing a baseball swing with perceptible cues for the individual to follow.

FIG. 3A shows a screenshot of the expert 301 leaning forward prior to a swing. This screenshot includes a visual cue of a first falling ball 302A on the left and an auditory sound when the first falling ball 302A hits a bottom, signaling a first defined motion stage of when the individual 303 should be leaning forward. The first falling ball 302A for the first defined motion stage of leaning forward might be a first color, such as green for example.

Figure 3B:
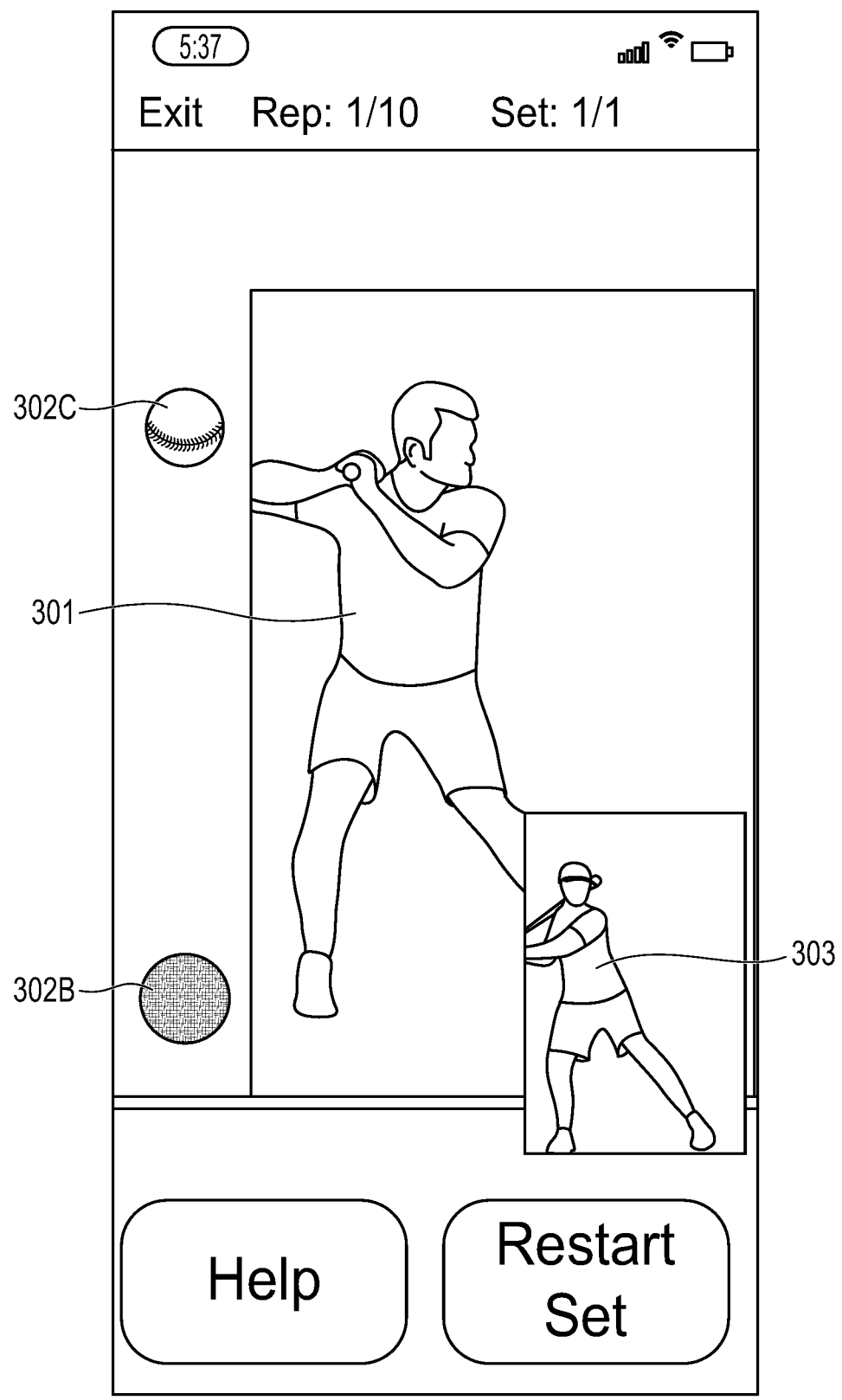

FIG. 3B shows a screenshot of the expert 301 leaning back prior to a swing. This screenshot includes a visual cue of a second falling ball 302B on the left and an auditory sound when the second falling ball 302B hits the bottom, signaling a second defined motion stage of when the individual should be leaning back. The second falling ball 302B for second defined motion stage of leaning back might be a color different from the first color, such as orange for example.

Figure 3C:
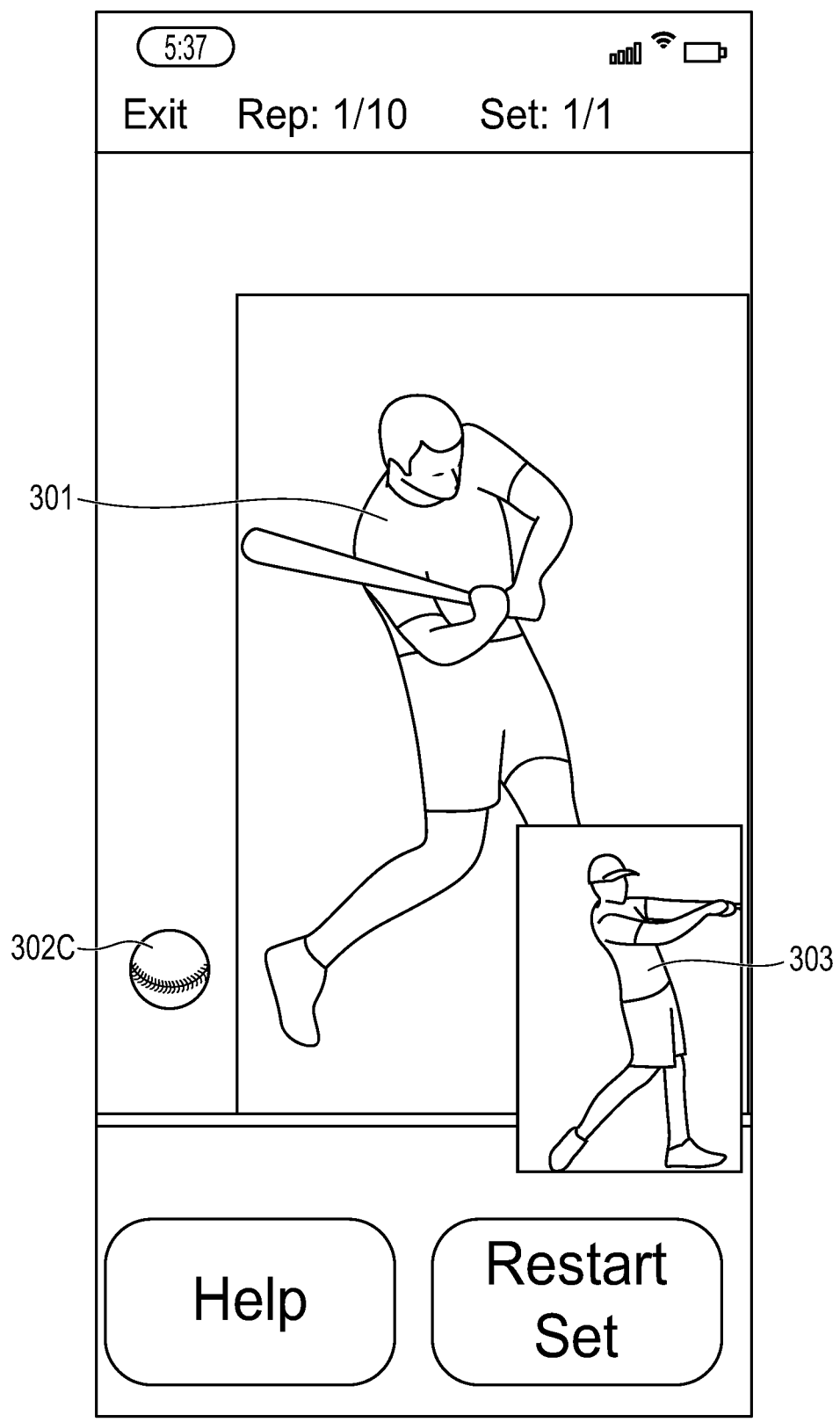

FIG. 3C shows a screenshot of the individual moving forward and executing the swing. This screenshot includes a visual cue of a third falling ball 302C on the left and an auditory sound when the third falling ball 302C hits the bottom, signaling when the individual should be executing third defined motion stage of the swing. The third falling ball 302C for the third defined motion stage of the swing might be a color different from the first and second colors, such as white for example.

For each defined motion, the speed at which the falling ball 302A-C moves to hit the bottom is based on a duration of the defined motion. For some athletic motions, all defined motions will have a same duration. However, for other athletic motions, defined motions will have variable duration. By setting the speed of the falling balls 302A-C based on duration of the defined motions, it is possible to convey timing information to the individual in an easy to perceive visual manner. Combined with the audio cues of when the falling balls 302A-C impact the bottom, it may be possible for the individual to perceive the timing information without constantly having to view the client device 120. After several repetitions, it may be possible for the individual to practice some repetitions primarily based on the audio cues without having to view the client device 120 very much.

It is to be understood that other visual and/or audio cues (and/or haptic cues) are possible and are within the scope of the disclosure. In some implementations, the pre-recorded video of the expert 301 includes the perceptible cue 302A-C for each defined motion stage of the athletic motion. This can ensure that the perceptible cues 302A-C remains synchronised with the expert 301 in the pre-recorded video. In other implementations, the perceptible cue 302A-C for each defined motion stage of the athletic motion is separate from the pre-recorded video.

In some implementations, multiple repetitions of the athletic motion are performed. Therefore, with reference back to FIG. 2, until the repetitions are finished at step 205, steps 201 to 203 can be repeated. In particular, the client device 120 repeats the playing of the pre-recorded video for a plurality of repetitions at step 201 and concurrently generates the perceptible cues at step 202. Meanwhile, the client device 120 also records the individual attempting the athletic motion with the repetitions. Note that such recording at step 203 is continuous, such that a newly recorded video is a single continuous recording that captures all of the repetitions of the athletic motion performed by the individual.

In some implementations, after the multiple repetitions have been completed at step 205, the client device 120 executes a playback review at step 206, which involves repeatedly playing back the expert performing the athletic motion for the repetitions simultaneously with the playback of the individual based on the single continuous recording. In some implementations, during the playback review, the expert 301 and the individual 301 are shown simultaneously side by side. See for example FIGS. 4A and 4B. Other arrangements are possible, such as one on top of another, for example. In some implementations, the perceptible cues 302A-C are included in the playback review. See for example FIG. 4A. In other implementations, the perceptible cues 302A-C are not included in the playback review. See for example FIG. 4B.

Unfortunately, repeatedly playing the pre-recorded video at step 201 while the single continuous recording is being recorded at step 203 involves a variable latency before each instance that the pre-recorded video is played. In other words, there is a delay each time the pre-recorded video is played. See for example FIG. 5, which shows an initial offset o before between when the single continuous recording begins and when the pre-recorded video begins playing. Also, for each subsequent instance that the pre-recorded video is played, there is a time delay dr, to start the subsequent instance after completing a previous instance. Each variable latency could be relatively small (e.g. 100 ms to 250 ms). However, the variable latencies are additive, such that they can add up to a significant amount.

One approach may be to try to control and/or mitigate the variable latencies. Unfortunately, due to other processes that may be operating on the client device 120, it is difficult to control and/or mitigate the variable latencies. Moreover, the variable latencies are not necessarily predictable and are not constant, but rather are variable based on factors such as other processes that may be operating on the client device 120. In some implementations, rather than trying to control and/or mitigate the variable latencies, at step 204 the client device 120 measures the variable latencies, such that the playback review at step 206 can be executed in a way that synchronises the repeatedly playing back of the expert with the playback of the individual by accounting for each variable latency that has been measured at step 204. The synchronisation can make it easier for the individual to visually compare the expert to themselves during the playback review at step 206.

Figure 5:
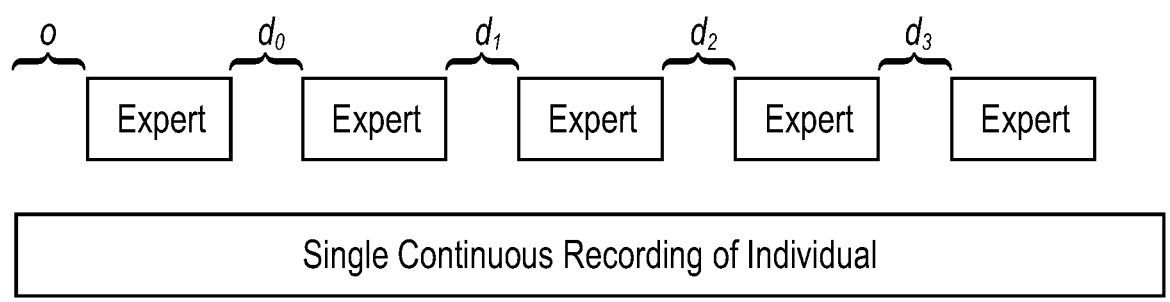
FIG. 5 is a schematic illustrating variable latencies in repeatedly playing a pre-recorded video.

In some implementations, with reference to FIG. 5, the client device 120 measures the initial time offset o between when the single continuous recording begins and when the pre-recorded video begins playing. Also, for each subsequent instance that the pre-recorded video is played, the client device 120 measures a time delay $d_n$ to start the subsequent instance after completing a previous instance. Then, for each repetition, the client device 120 calculates a time marker in the single continuous recording that the repetition of the athletic motion begins based on the initial time offset, all of the time delays preceding the repetition, and a duration $d_v$ of the pre-recorded video. For example, for the third repetition shown in FIG. 5, the time marker in the single continuous recording would be $tm=o+d_v+d_0+d_v+d_1=0+d_0+d_1+2xd_v$. Thus, during the playback review, at a beginning of each repetition of the pre-recorded video, the client device 120 can skip to the time marker in the single continuous recording associated with that repetition.

In another implementation, video rendering is performed by the server 110. After the client device 120 measures the initial time offset o and each time delay $d_n$, the client device 120 uploads the single continuous recording and timing information based on the initial time offset o and each time delay $d_n$. The server 110 can then generate a rendered video having a rendered combination of the single continuous recording and the repetitions of the pre-recorded video such that, at a beginning of each repetition of the pre-recorded video in the rendered combination, the single continuous recording is at a time marker associated with that repetition. Each time marker can be calculated by the client device 120 and provided to the server 110 as the timing information. Alternatively, the client device 120 can provide the initial time offset o and each time delay $d_n$ as the timing information, such that the server 110 can calculate the each time marker. The client device 120 can then download the rendered video prepared by the server 110 and play the same for the playback review. The rendering performed by the server 110 can make it possible to perform functions such as blending or superimposing without tasking the client device 120 with excessive computation.

Although the video synchronisation and rendering features have been described above in relation to training the individual to perform an athletic motion, it is noted that these features can be implemented for other purposes. For instance, with reference back to FIG. 2, the pre-recorded video at step 201 can include first content which is not necessarily an expert performing an athletic motion, and the single continuous recording at step 203 can include second content which is not necessarily an individual attempting to perform the athletic motion. However, the second content is related to the first content in that synchronisation between the two in the manner described above would still be desirable. The synchronisation can be implemented completely by the client device 120 or in part by the server 110. As noted above, some implementations involve the server 110 for rendering.

Figure 6:
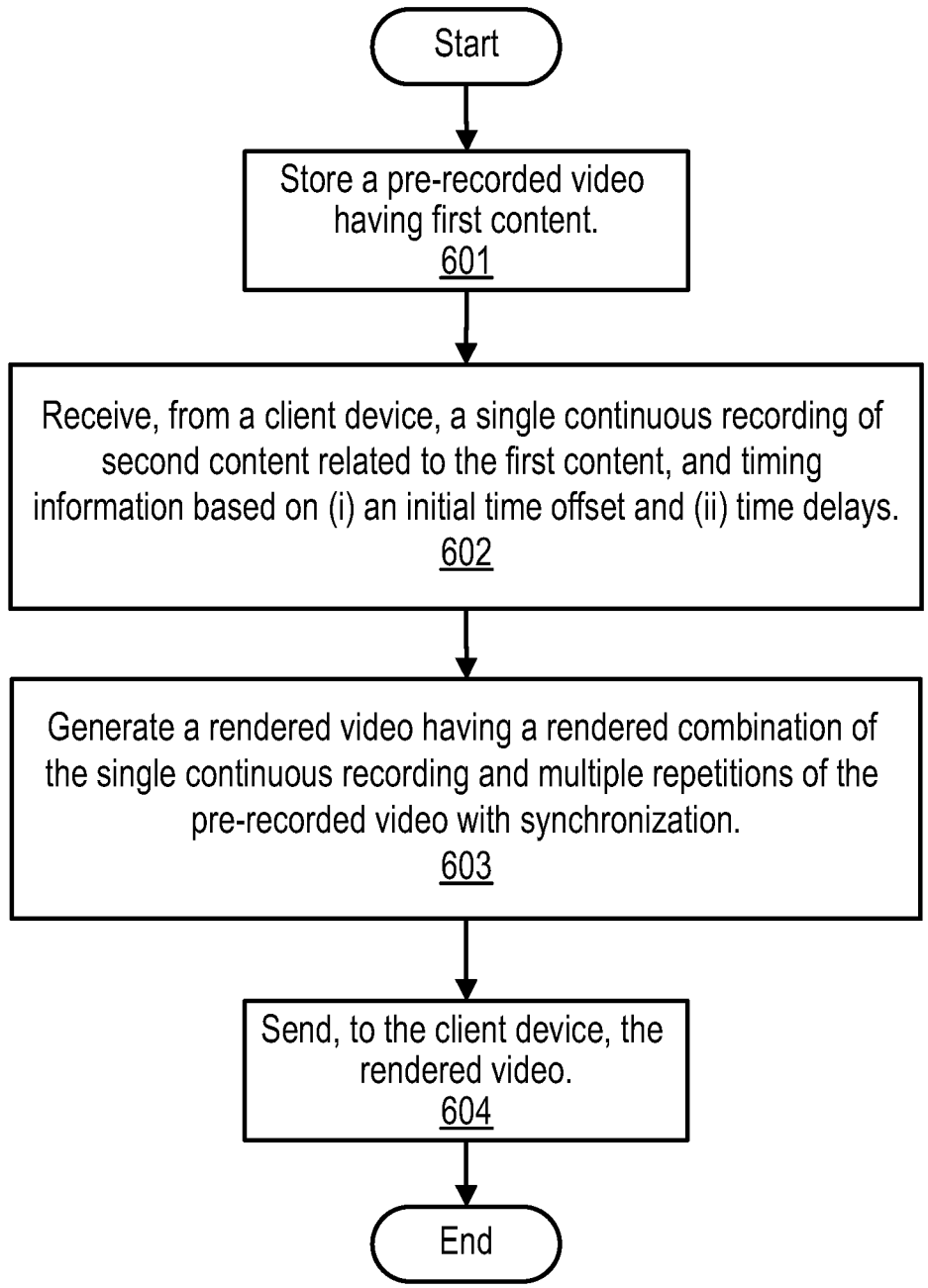
FIG. 6 is a flowchart of a method of rendering video with synchronisation.

Operation of the video circuitry 114 of the server 110 will be described below with reference to FIG. 6, which is a flowchart of a method of rendering video with synchronisation. Although the method of FIG. 6 is described below with reference to the server 110 in the communication system 100 shown in FIG. 1, it is to be understood that the method of FIG. 6 is applicable to other systems. In general, the method of FIG. 6 is applicable to the server 110 in any appropriately configured system.

At step 601, the server 110 stores a pre-recorded video having first content. At step 602, the server 110 receives, from a client device 120, a single continuous recording of second content related to the first content, and timing information based on (i) an initial time offset between when recording of the single continuous recording began and when playing of the pre-recorded video began for a first instance, and (ii) for each subsequent instance that the pre-recorded video was played, a time delay to start the subsequent instance after completing a previous instance. The timing information can include the initial time offset o and each time delay $d_n$, such that the server 110 can calculate the each time marker. Alternatively, the timing information can include each time marker as calculated by the client device 120.

At step 603, the server 110 generates a rendered video having a rendered combination of the single continuous recording and multiple repetitions of the pre-recorded video corresponding to how many instances the pre-recorded video was played, such that, at a beginning of each repetition of the pre-recorded video in the rendered combination, the single continuous recording is at the time marker associated with that repetition. Finally, at step 604 the server 110 sends, to the client device 120, the rendered video.

Figure 4A:
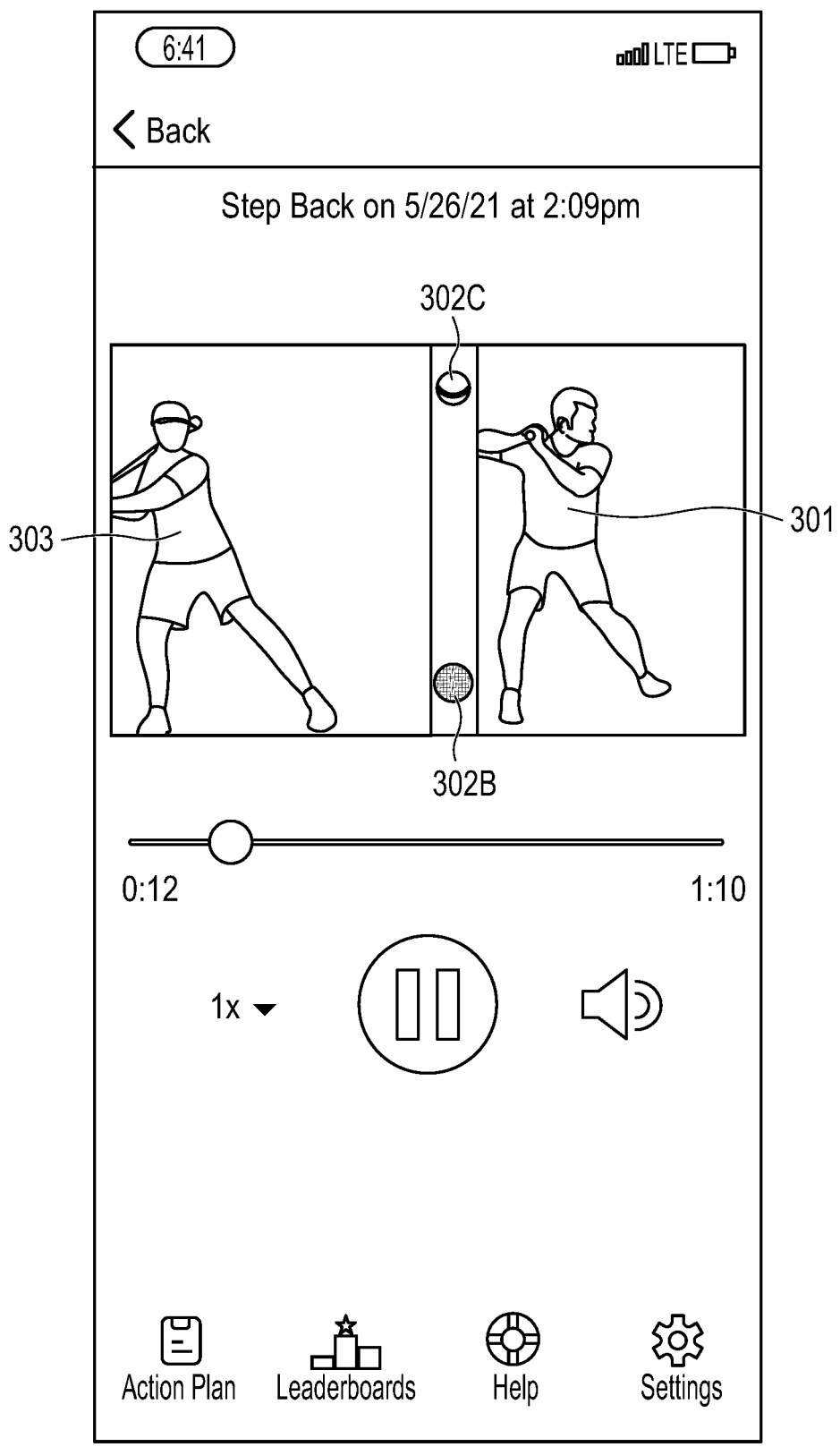
FIGS. 4A and 4B are screenshots of playback review comparing the expert executing a baseball swing to the individual.
Figure 4B:
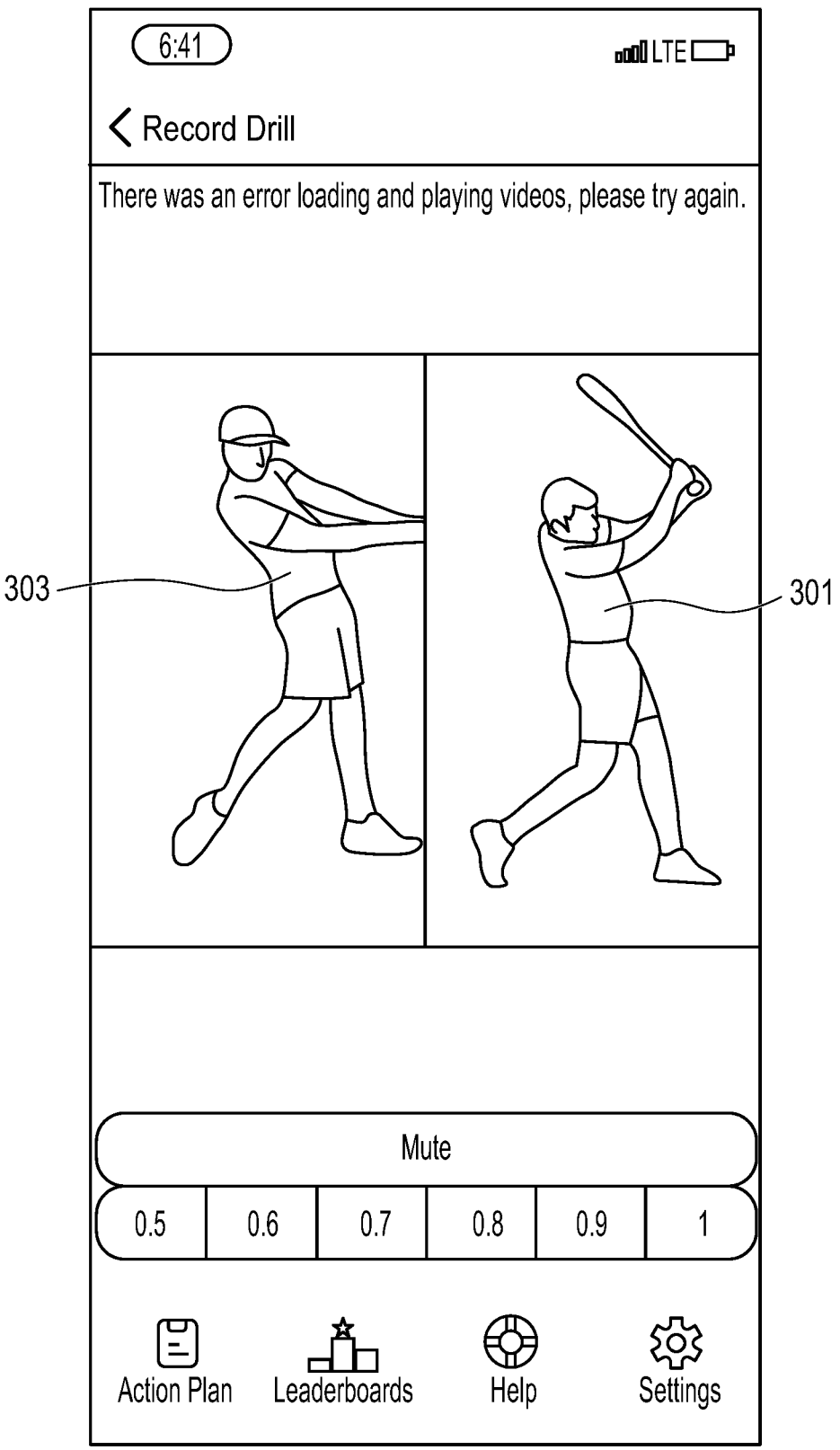

In some implementations, the server 110 generates the rendered video by blending or superimposing the single continuous recording with the multiple repetitions of the pre-recorded video. Thus, rather than having a side by side view for the playback review, for example as shown in FIGS. 4A and 4B, it is possible to have blending or superimposing. That being said, the side by side view is still a possibility. The rendering performed by the server 110 can make it possible to perform functions such as blending or superimposing without tasking the client device 120 with excessive computation.

There are many possibilities for the client devices 130 and 131-133. The client devices 130 and 131-133 can for example include a tablet computer 311, a smartphone 132, a laptop 133, and/or any other appropriate client device. Any combination of client devices is possible. The client devices 130 and 131-133 can communicate with the server 110 using wireless connections as depicted and/or wired connections. Although only four client devices 130 and 131-133 are depicted, it is to be understood that there can be more or less than four computing devices.

There are many possibilities for the network 140. The network 140 can include several different networks even though such details are not shown for simplicity. For example, the network 140 can include a RAN (Radio Access Network) for communicating with wireless stations and the Internet for communicating with numerous other computing devices. The network 140 can have other components as well, but these details are not shown for simplicity.

There are many possibilities for the server 110. In some implementations, the server 110 includes a web server and data sent by the server 110 includes web content for a web browser. Additionally, or alternatively, the server 110 can include an application server and data sent by the server 110 includes content for a mobile app. Other implementations are possible.

There are many possibilities for the network adapter 112 of the server 110. In some implementations, the network adapter 112 is a single network adapter 112. In other implementations, the network adapter 112 includes multiple network adapters, for example a first network adapter for communicating with the one or more client devices 130 and 131-133, and a second network adapter for communicating with other client devices, such as client devices utilized by a system administrator. Both wireless and wired network adapters are possible. Any suitable network adapter that can communicate via the network 140 is possible.

According to another embodiment of the disclosure, there is provided a non-transitory computer readable medium having recorded thereon statements and instructions that, when executed by the processor 125 of the client device 120, implement a method as described herein. The non-transitory computer readable medium can be the computer readable medium 126 of the client device 120 shown in FIG. 1, or some other non-transitory computer readable medium.

According to another embodiment of the disclosure, there is provided a non-transitory computer readable medium having recorded thereon statements and instructions that, when executed by the processor 116 of the server 110, implement a method as described herein. The non-transitory computer readable medium can be the computer readable medium 118 of the server 110 shown in FIG. 1, or some other non-transitory computer readable medium.

There are many possibilities for non-transitory computer readable medium. Some examples include an SSD (Solid State Drive), a hard disk drive, a CD (Compact Disc), a DVD (Digital Video Disc), a BD (Blu-ray Disc), a memory stick, or any appropriate combination thereof.

Training App

In some implementations, at least some of the functionality described herein for the client device 120 is provided by way of a Training App that is downloaded onto the the client device 120, for example from the server 110, and executed by the client device 120. Example details of the Training App are provided in this section. It is to be understood that these details are very specific for exemplary purposes only.

Although various functionality is described above for the server 110, it is noted that other implementations are possible without such functionality. For example, in other implementations, the client devices 120 and 131-133 obtain the Training App via other means without the server 110.

Figure 7:
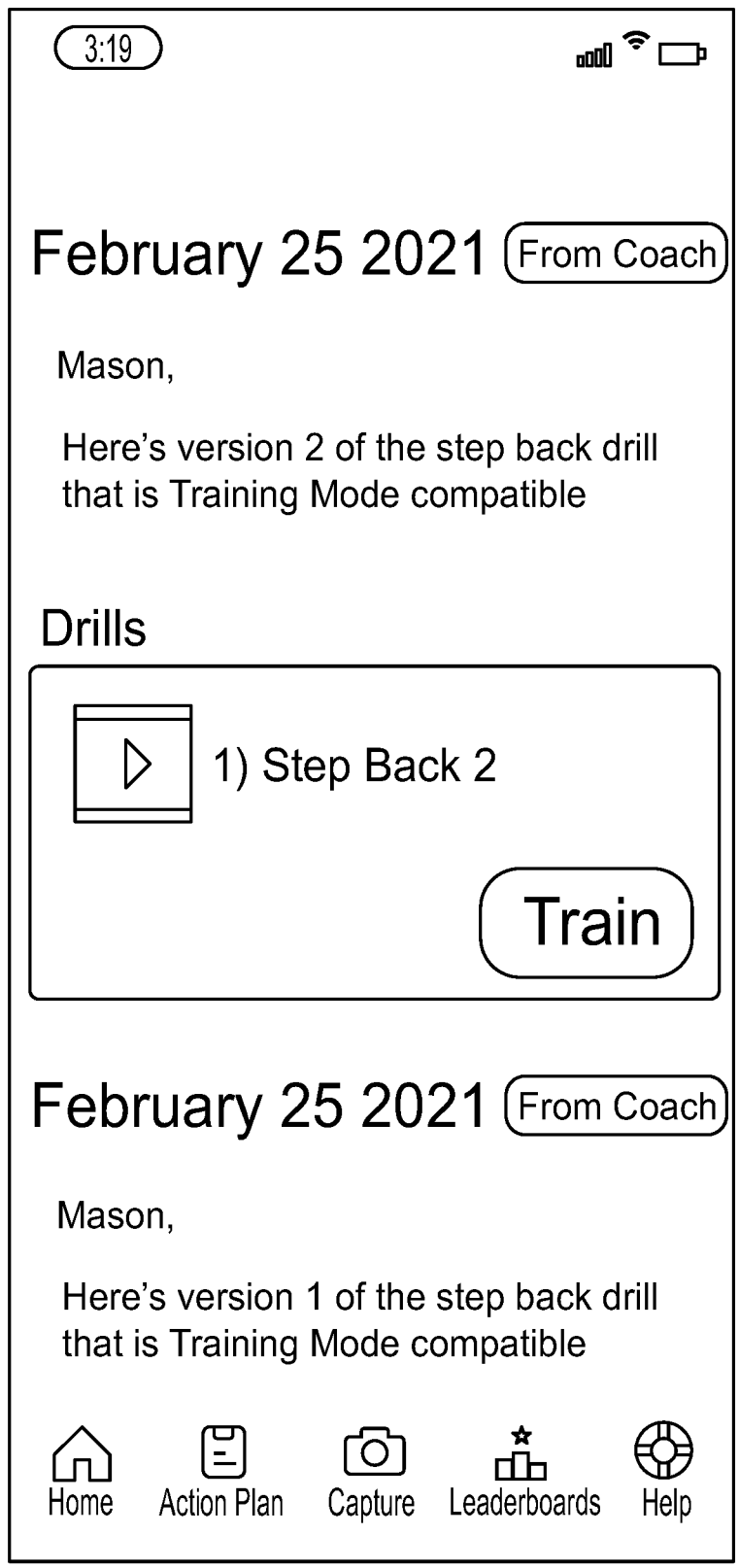
FIGS. 7 and 8 are screenshots of tutorial videos including "Step Back 2"
Figure 8:
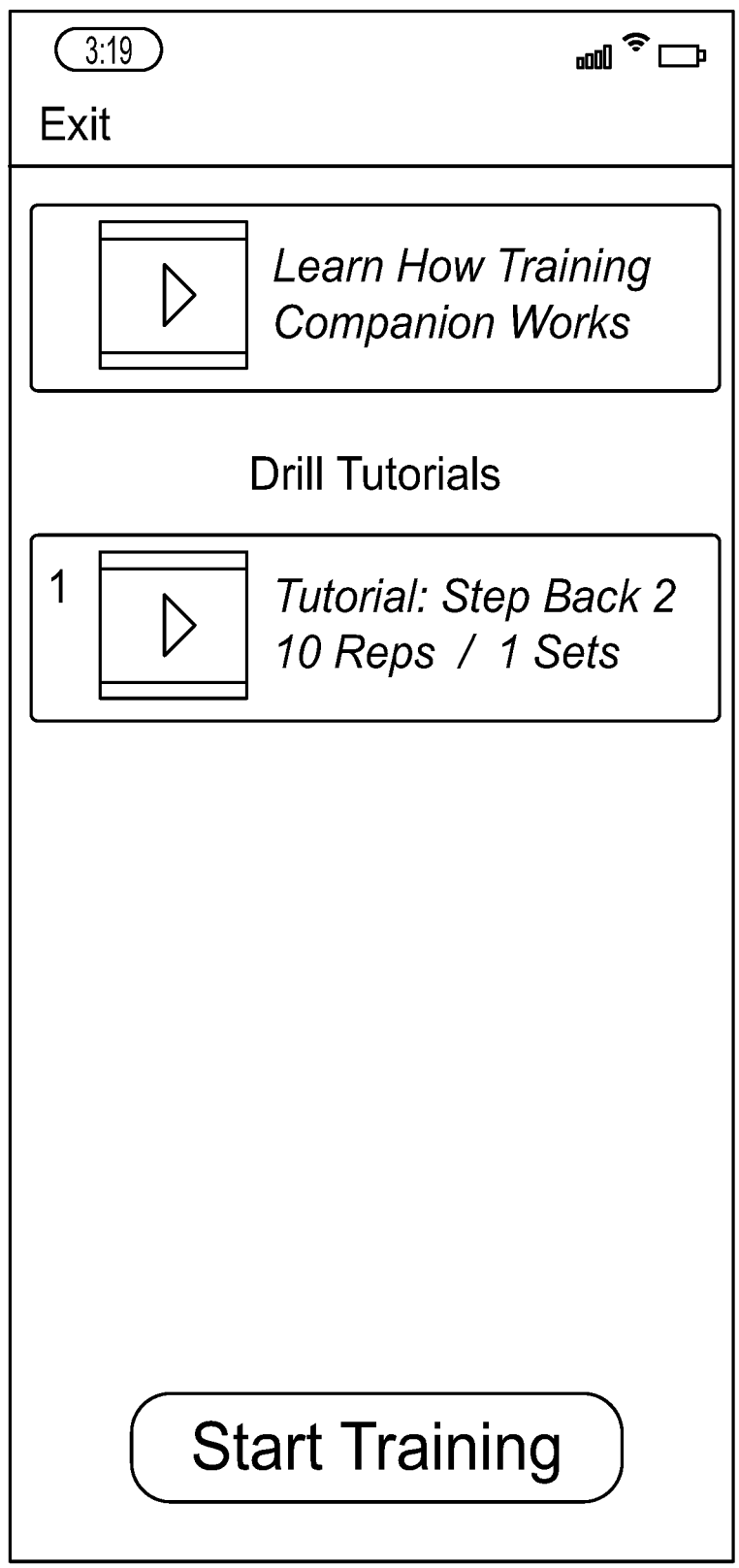

In some implementations, the Training App initially displays a set of at least one tutorial video to show how to train drills that have been assigned for a current week. For example, FIGS. 7 and 8 show screenshots of tutorial videos including "Step Back 2". This enables the individual to watch the tutorial videos at least once to learn how to do the drills correctly.

In some implementations, the Training App provides "Drill", which is a resource that contains a definition for specific drills, such as the "Step Back" drill. Drills also can contain a number of videos, all created and edited, and are hosted on YouTube® or Vimeo® for example with links saved in a backend system.

Drill Video: Roughly 30 seconds long, contains a breakdown of the drill with written and/or spoken explanation of the pieces. The player will view this video prior to training to get more context on its pieces and how it will help.
  Cue Video: Roughly 5-10 seconds, showing 2-3 reps of the drill being performed from various angles. The player will view this video prior to training to get more familiar with the movement pattern in isolation.
  Training Mode Cue Video: Roughly 10 seconds, shows one rep of the drill being performed from the angle that is best suited for the given drill. The player will view/listen to this video while actively training, attempting to match timing and body positions.

In some implementations, the Training App provides an Assigned Drill, which is a higher level resource that is assigned to the individual when they are to train a specific drill, with a specified amount of sets and reps. These sets and reps are used to drive the number of times that a player will do a specific drill when going through training mode.

Figure 9:
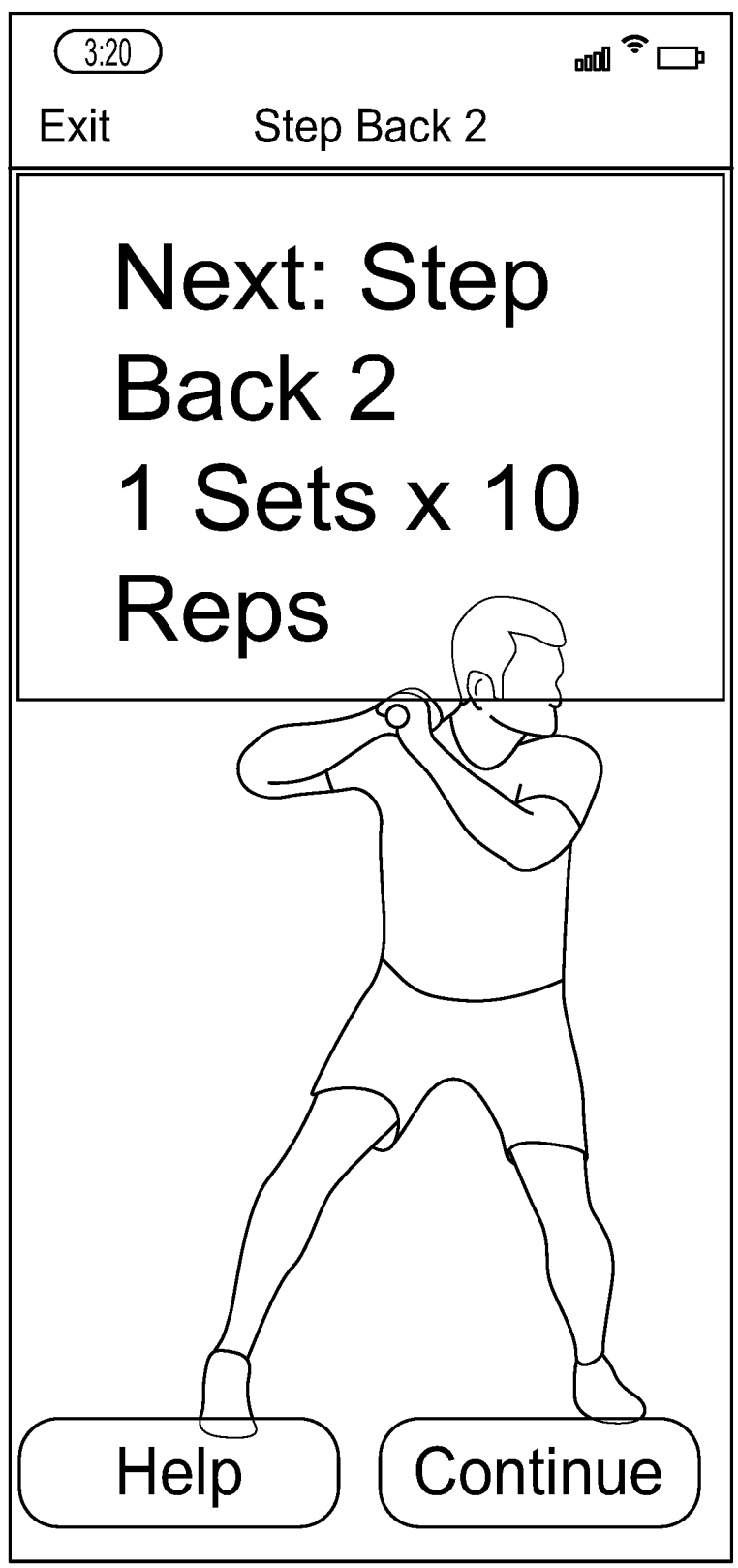
FIG. 9 is a screenshot of the individual's first drill.

In some implementations, when the individual is ready and presses a train button, the Training App displays a preview screen showing how to set up the smartphone to record from a proper angle and also showing a short clip of the individual's first drill. For example, FIG. 9 shows a screenshot of the individual's first drill.

Figure 10A:
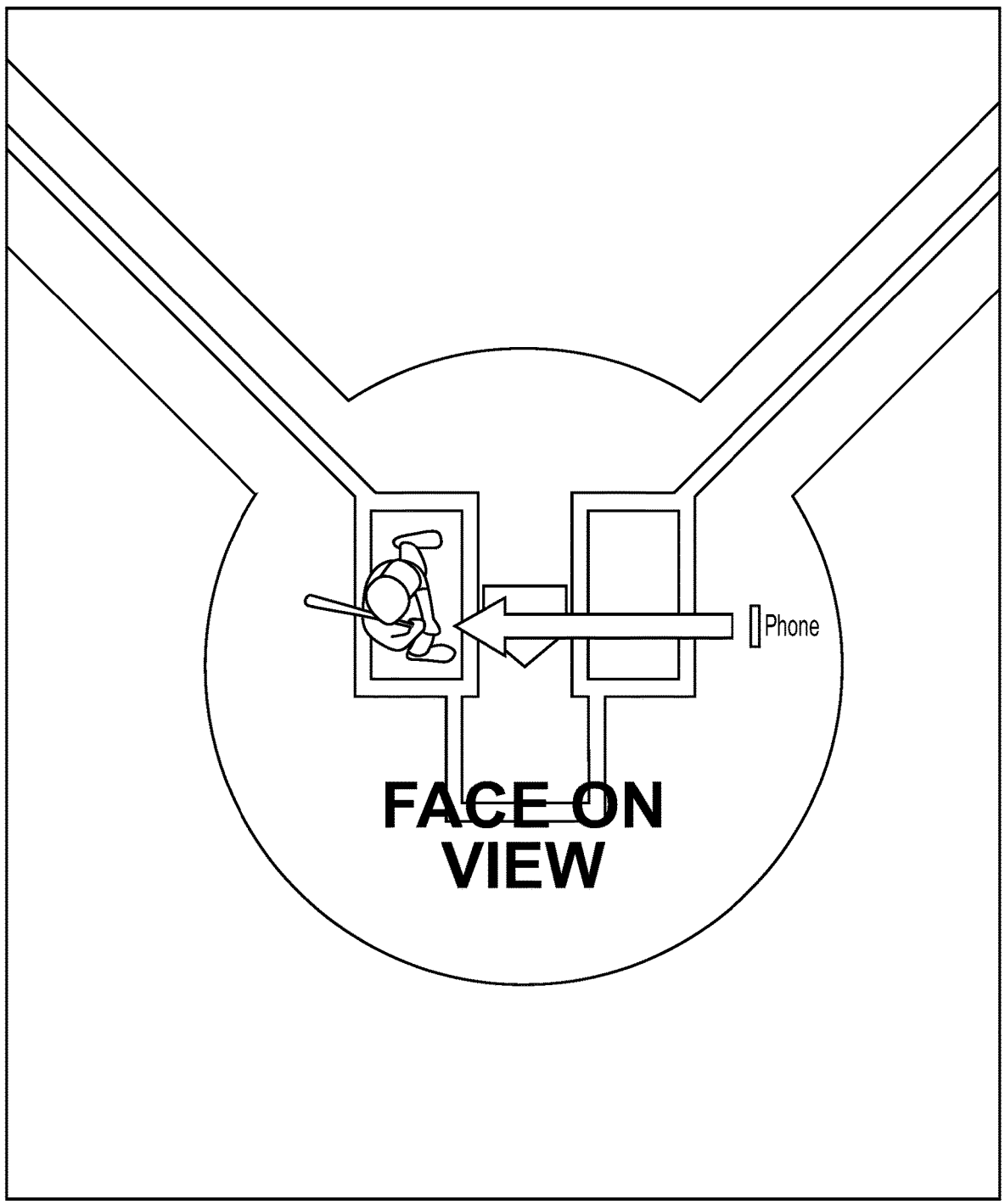
FIGS. 10A to 10C are schematics of a smartphone in various positions for different views.
Figure 10B:
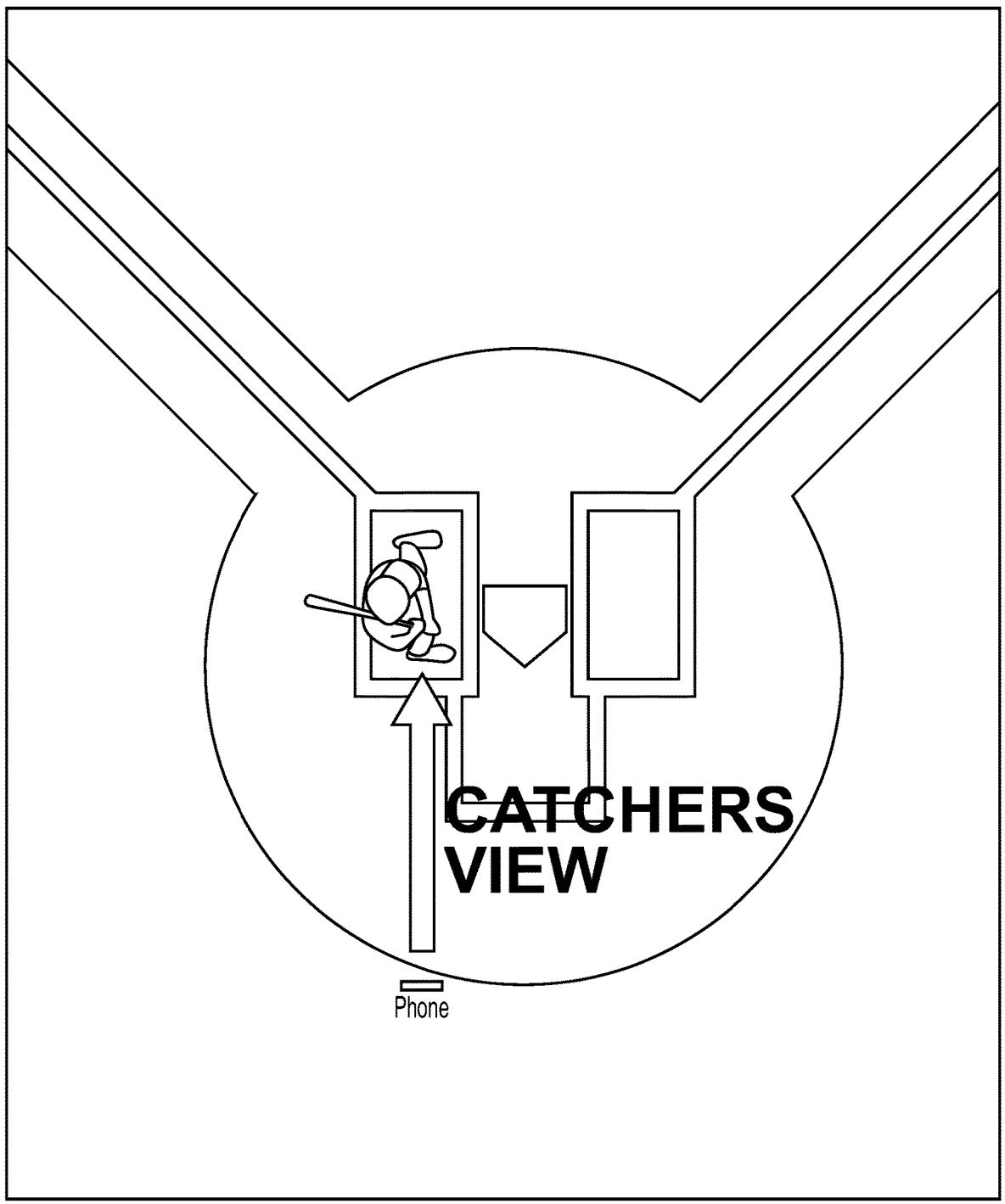
Figure 10C:
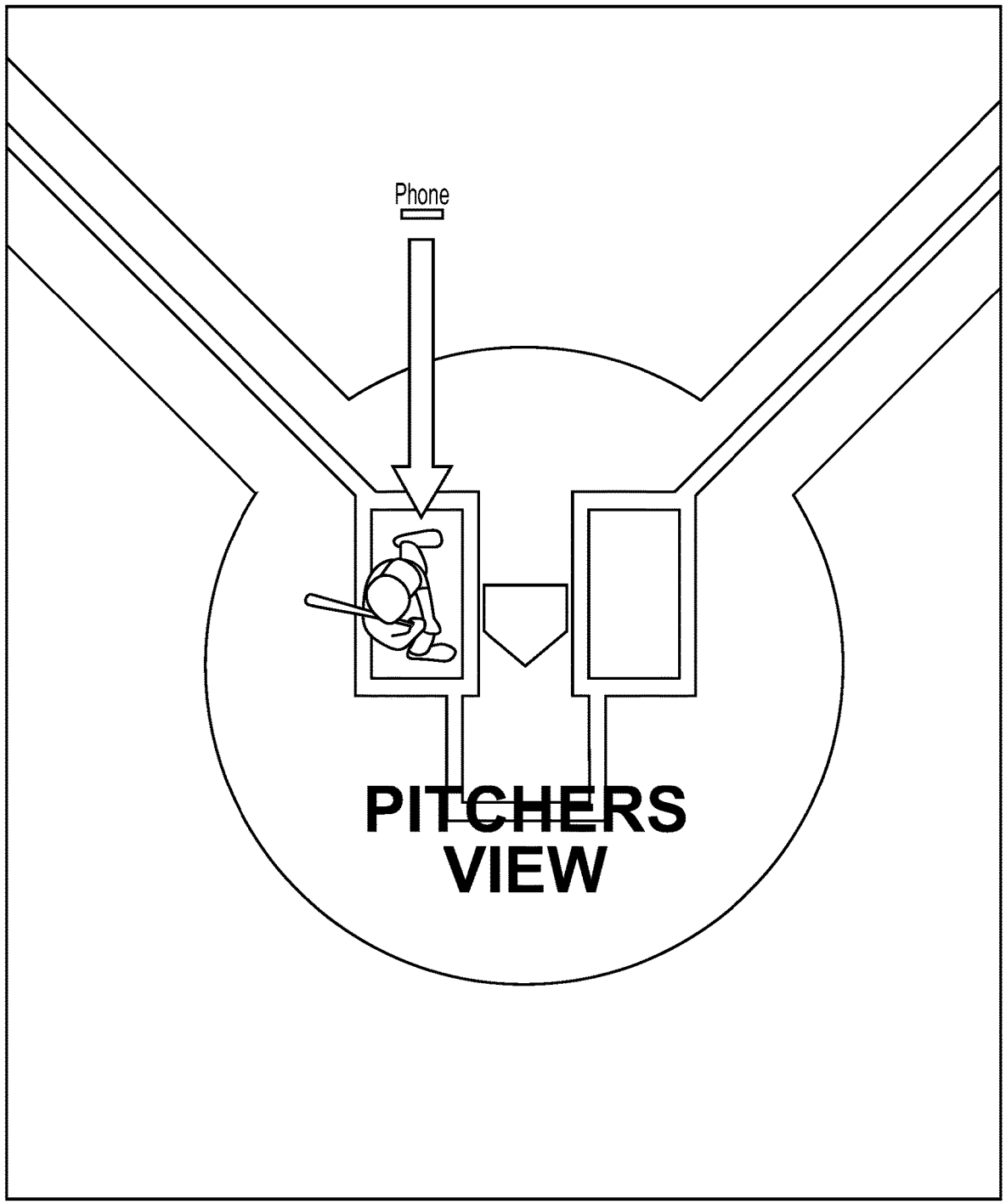

In some implementations, depending on the drill, the smartphone can be positioned to record from varying positions. For example, FIG. 10A shows a schematic of the smartphone in a face-on view, FIG. 10B shows a schematic of the smartphone in a catcher's view, and FIG. 10C shows a schematic of the smartphone in a pitcher's view.

Once the individual knows which drill to train, the individual can position the smartphone in a proper position to record the training. For the individual to get their full body in a video frame, the smartphone can be positioned close to ground with a front-facing camera tilted slightly upwards toward the individual. For example, the smartphone can be positioned using a stand. However, other positioning means are possible, such as a tripod or even a solid object such as a wall for example.

Figure 11:
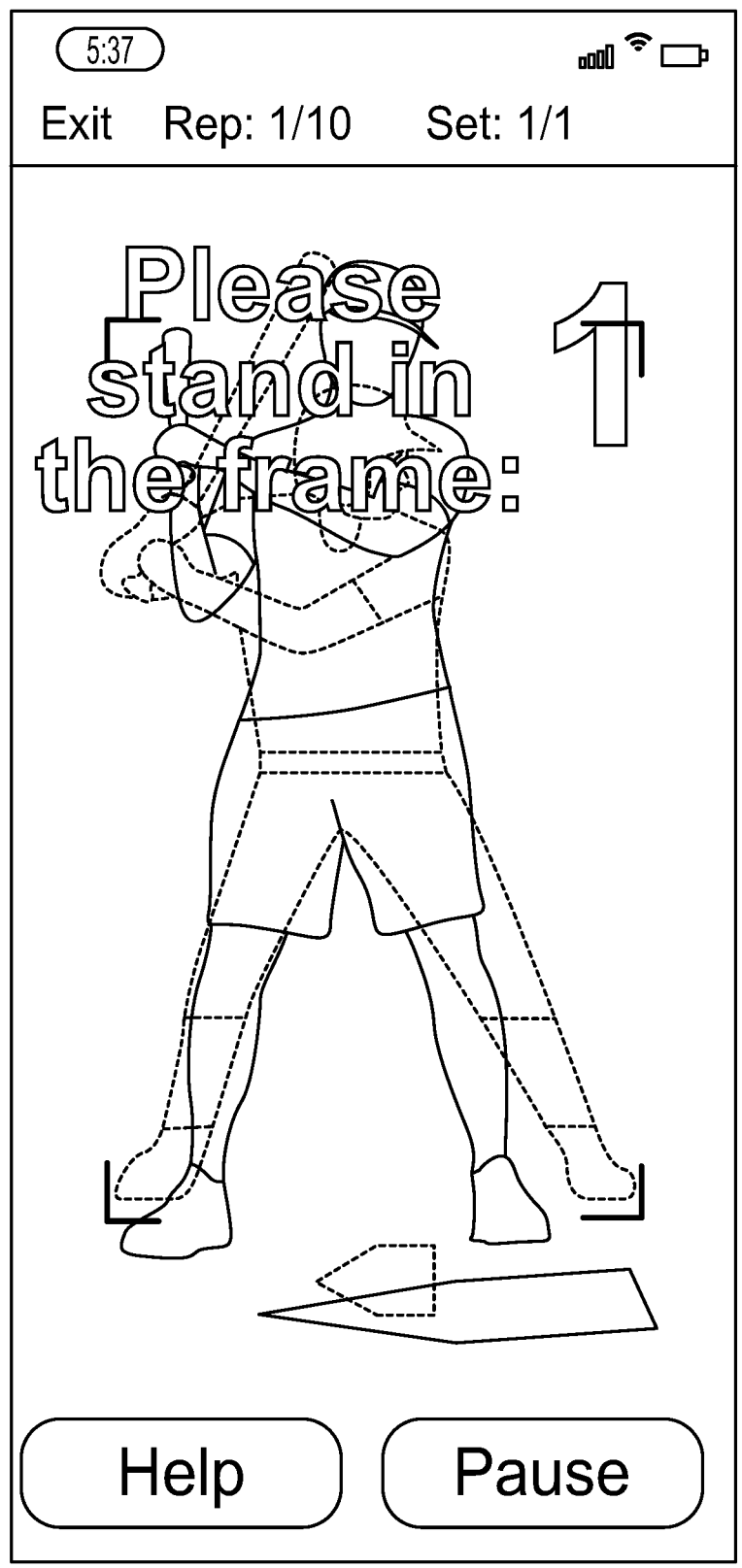
FIG. 11 is a screenshot of the individual and an outline of a batter representing a target position for the individual.

In some implementations, the Training App will help guide the individual by displaying a live video stream from a front-facing camera with an outline of a batter to line themselves up with. For example, FIG. 11 shows a screenshots of the individual and an outline of a batter representing a target position for the individual. In some implementations, the Training App displays a counter that counts down from several seconds (in the illustrated example the counter is down to one second) to give the individual sufficient time to line themselves up against the outline before the Training App starts training as described below.

Thus, prior to the drill, there is a countdown of 3+ seconds, depending on how much time has been assigned to set up for a given rep. This countdown shows large numbers in the center of the screen with auditory accompaniment saying the numbers as they are shown.

In some implementations, the Training App has a pause button that the user can press to allow more time to line themselves up against the outline. In some implementations, the Training App is configured to respond to audio input received by a microphone of the mobile device, and wherein verbal instructions by a user, such as "Pause," "Stop," or "Next Step," will cause the Training App to pause, stop or proceed to the next step without the user having to physically press a button on the mobile device.

In some implementations, the Training App is configured to use computer vision to detect body or hand gestures from the user that signify whether to "Pause," "Stop," or "Next Step." In some implementations, the Training App is configured to not proceed to the next step unless the user is aligned against the outline.

After "1" is reached, the drill is shown alongside auditory and visual cues marking key points in the drill. In some implementations, all auditory and visual cues are embedded in the video itself during production. Timing and placement are all done by hand by a combination of our in-house baseball experts and video producers.

In some implementations, once the counter gets to zero, the Training App automatically starts recording the individual while also playing a video for the individual to follow along with. In some implementations, the Training App simultaneously displays the individual in real-time alongside the video for the individual to follow along with.

As balls drop on the left side of the screen, they intersect the line at the bottom, which will light up upon intersection. Audio cues that read off the next move will be synced with this intersection. For example, the Step Back drill has three parts—"Front", "Hop Back", "Swing"—that are said aloud at the same time as the corresponding left ball intersects the bottom line.

Training Event is a resource representing a single training session, recorded at the end of training a given drill in Training Mode. This resource contains ties to the drill trained as well as the exact training mode cue video used.

Figure 12:
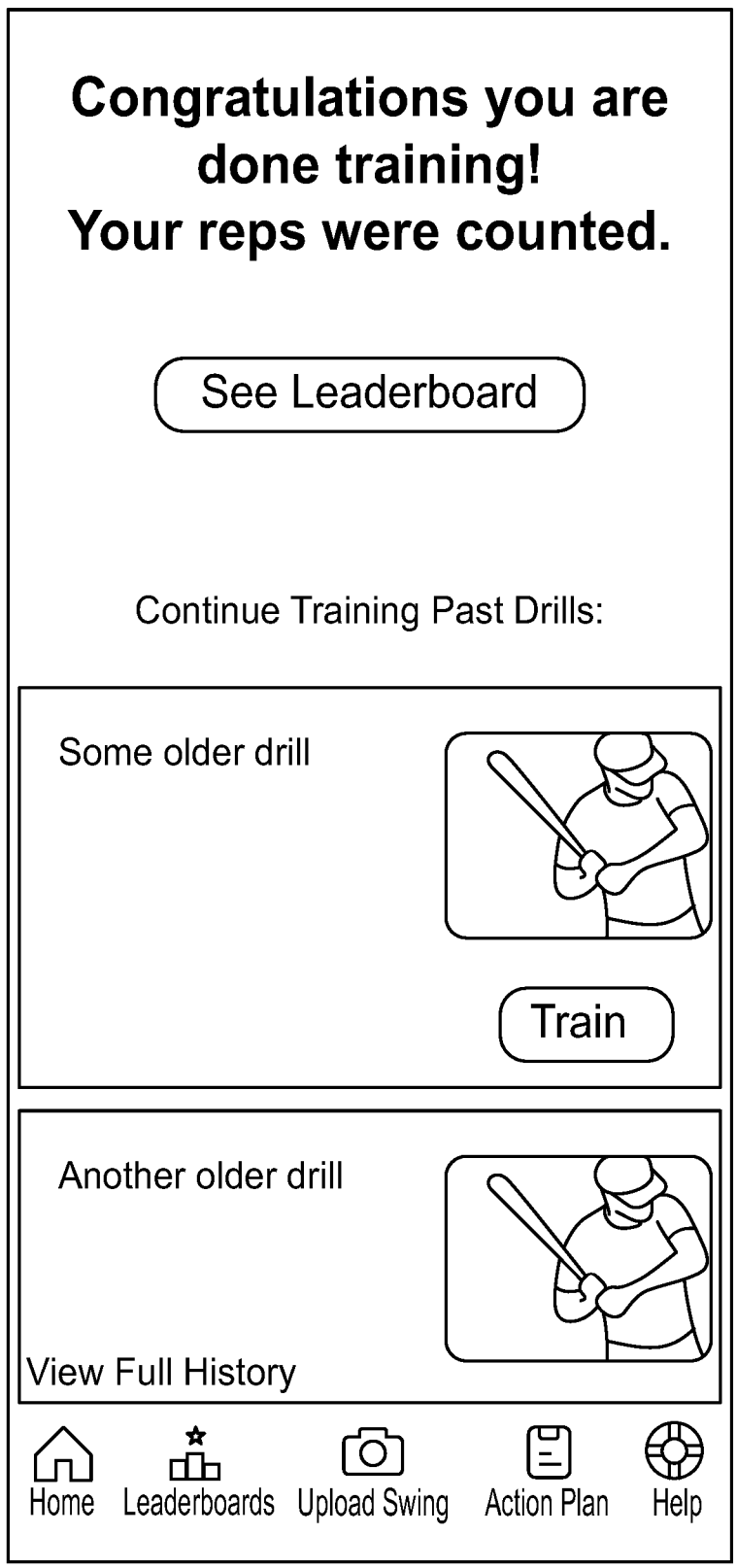
FIG. 12 is a screenshot of options to view a leaderboard and to train past drills.

In some implementations, once all assigned drills have been completed, the Training App automatically logs training and score runs for a leaderboard. In some implementations, the Training App provides an option to continue training past drills from here if the individual desires to do so. For example, FIG. 12 shows a screenshot of options to view a leaderboard and to train past drills.

In some implementations, the server 110 maintains a record to facilitate score sharing among individuals using the Training App across the network 140 and/or enables an online or virtual leaderboard, and/or to coordinates one or more games. In some implementations, the information is stored in a database 119 on the server 110 or in another remote location accessible through the network 140. In some implementations, the leaderboard is updated in real-time or at least on a daily basis and can be distributed to all users at the same time via the Training App. Videos and training history can be stored for each individual user on the server 110.

Figure 13:
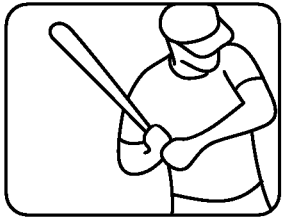
FIG. 13 is a screenshot of a training history card.

In some implementations, upon the individual selecting a home tab, the Training App displays thumbnail images on a training history card. For example, FIG. 13 shows a screenshot of a training history card. In some implementations, upon the individual selecting one of the thumbnail images, the Training App displays a side-by-side video of the drill reps next to the baseball expert.

In some implementations, the Training App enables a simple way for an individual to record themselves while they train on drills and then see how they compare to an expert in a side-by-side video. For example, FIGS. 4A and 4B show screenshots of the individual 303 on a left side compared to the expert 301 on a right side for a case of a baseball swing.

By displaying a video with audio and/or visual cues, the Training App can allow the individual to match timing and then using that to sync a recorded video of themselves with the video of a baseball expert for side-by-side review. The combination of the audio and/or visual cues and the simultaneous displays can be particularly useful for training purposes. The Training App can also be configured to include haptic cues, such as causing an individual's smart watch to vibrate to help match the timing of each rep.

Training

Further example details of a training mode are provided. It is to be understood that these details are very specific for exemplary purposes.

Upon entering the training mode flow, all training mode cue videos are fully downloaded to the user's device and cached behind the scenes. In most scenarios, this will occur while the user is reviewing their drills and setting up their phone so that there is low lag time once they are ready to start training.

Upon starting a drill, the drill's cue video is loaded from the cache and into the video player. When training starts, the Training App starts recording a video using the device's built in camera while simultaneously playing the drill's cue video. When recording and cue video playback starts, the Training App:

Listens for when recording fully starts and saves a corresponding timestamp in an internal state.

Listens for when video playback fully starts and saves a corresponding timestamp in an internal state.

The cue video will loop n times (where 'n' is assigned reps x assigned sets, or total repetitions), not interrupting camera recording, until the user has completed all sets and reps for the assigned drill.

While the cue video is playing, the Training App listens for changes in the cue video's progress. When the Training App detects that a single loop of the video has ended, the Training App:

Increments internal counters to keep track of how many sets and reps have been completed. These are also displayed to the user so that they can check on their progress as may be desired.

Saves the time that the video ended in an internal state for later use.

Upon the start of the next loop of the video, the Training App:

Calculates the time delta d based off of the previously saved end time (adjusting for how the video may have already started progressing).

Saves that difference d in a list in an internal state, where there is one time delta $d_n$ per video loop.

Upon completion of the entire drill, the Training App:

Calculates the start offset o, which is the difference between the time that the cue video started playing and the time that video recording started.

Save the start offset o and list of deltas $d_n$ to a file in the device's local filesystem.

Saves the recorded video to a known location in the device's local filesystem.

Uploads a Training Event to a backend tied to the user and the drill that was trained.

Uploads the recording of the user training to the backend, storing in Azure Blob Storage (Microsoft's implementation of large file storage) for example.

In some implementations, because data is uploaded in chunks, the Training App can track upload progress and retry uploads on network failures or application closure.

In some implementations, the Training App can do some sort of post processing on a cloud backend that could include, but is not limited to: automatic analysis of the player, merging of the recorded video and the training mode cue video into a single playable video, etc.

If the user has another drill lined up, they go back to the starting the drill step mentioned above for that drill. If not, the flow is completed.

Playback Review

Upon loading a previous training session, the training mode cue video is fetched from the cache if it exists, or re-fetched from the network and stored in the cache, so that the user has the full video downloaded to prevent possible lagging due to streaming.

Deltas $d_n$ and the start offset o are loaded from the file saved to the device's local filesystem.

The recorded video of the player performing the drill is loaded into one video player, and the training mode cue video is loaded into the other video player (pictured on the next page), with controls (slider, playback rate) used to control both videos simultaneously.

On starting the playback, the start offset o is used to determine how to adjust the two videos to ensure that their starts are in sync. This could involve skipping o milliseconds forward on the camera recording, or skipping o milliseconds forward on the first loop of the cue video before starting playback.

Upon completion of 1 loop of the training mode cue video (1 rep of training), the training mode cue video is repeated. When the next loop starts, the camera recording is adjusted to match the intended timing of the training mode cue video. This is calculated using a combination of the start offset, accumulated deltas, training mode cue video length, and training mode cue video loops elapsed.

Note that this may cause the camera recording video to appear as if it skips slightly, depending on the magnitude of the start offset and the accumulated time deltas, but this will only happen between reps. This therefore has no effect on the player's ability to analyze their own training, and instead optimizes for the player's actual reps of the drill to be as synced as possible to the training mode cue video's reps of the drill.

Upon the end of n loops of the cue video or the end of the camera recording (whichever comes first), where n is the number of times a given drill was performed, both videos restart, jumping back to the step noted above for determining how to adjust the two videos to ensure that their starts are in sync.

If a user wishes, they can delete the resources associated with a given training mode session which will clear out stored videos and metadata from the phone's filesystem. This allows users to keep their memory usage down as may be desired.

The foregoing method descriptions and the process flow diagrams are provided merely as illustrative examples and are not intended to require or imply that the steps of the various embodiments must be performed in the order presented. The steps in the foregoing embodiments may be per-formed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been de-scribed above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM (random access memory), ROM (read only memory), EEPROM (electrically erasable programmable read-only memory), CD-ROM (compact disk read-only memory) or other optical disk storage, magnetic disk storage or other magnetic storage devices, or any other tangible storage medium that may be used to store desired program code in the form of instructions or data structures and that may be accessed by a computer or processor. Disk and disc, as used herein, include CD (compact disk), laser disc, optical disc, DVD (digital versatile disk), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

We claim:

1. A method for execution by a client device, comprising:
repeatedly playing a pre-recorded video for a plurality of repetitions, the pre-recorded video comprising first content; and
recording a newly recorded video concurrently with the repeatedly playing of the pre-recorded video such that the newly recorded video is a single continuous recording during all of the repetitions of the playing of the pre-recorded video, the single continuous recording comprising second content related to the first content;
wherein the repeatedly playing of the pre-recorded video while the single continuous recording is being recorded involves a variable latency before each instance the pre-recorded video is played, and the method further comprises:
measuring each variable latency; and
executing playback review by repeatedly playing back the first content for the repetitions simultaneously with playback of the second content in a manner that synchronizes the repeatedly playing back of the first content with the playback of the second content by accounting for each variable latency that has been measured.

2. The method of claim 1, wherein the measuring each variable latency and the accounting for each variable latency that has been measured comprises:
for a first instance that the pre-recorded video is played, measuring an initial time offset between when the single continuous recording begins and when the pre-recorded video begins playing;
for each subsequent instance that the pre-recorded video is played, measuring a time delay to start the subsequent instance after completing a previous instance;
for each repetition, calculating a time marker in the single continuous recording that the repetition of the first content begins based on the initial time offset, all of the time delays preceding the repetition, and a duration of the pre-recorded video; and
during the playback review, at a beginning of each repetition of the pre-recorded video, skipping to the time marker in the single continuous recording associated with that repetition.

3. The method of claim 2, wherein during the playback review, the first content and the second content are played simultaneously side by side.

4. The method of claim 1, wherein the measuring each variable latency and the accounting for each variable latency that has been measured comprises:
for a first instance that the pre-recorded video is played, measuring an initial time offset between when the single continuous recording begins and when the pre-recorded video begins playing;
for each subsequent instance that the pre-recorded video is played, measuring a time delay to start the subsequent instance after completing a previous instance;
uploading, to a server, the single continuous recording and timing information based on the initial time offset and all of the time delays;
downloading, from the server, a rendered video comprising a rendered combination of the single continuous recording and the repetitions of the pre-recorded video such that, at a beginning of each repetition of the pre-recorded video in the rendered combination, the single continuous recording is at a time marker associated with that repetition; and
playing the rendered video for the playback review.

5. The method of claim 4, wherein the rendered video comprises the single continuous recording blended or superimposed with the plurality of repetitions of the pre-recorded video.

6. A non-transitory computer readable medium having recorded thereon statements and instructions that, when executed by a processor of a client device, configure the client device to implement the method of claim 1.

7. A client device, comprising:
a network adapter;
a display;
a camera; and
training circuitry coupled to the network adapter, the display, and the camera, and configured to implement the method of claim 1.

8. The client device of claim 7, wherein:
the training circuitry comprises a processor; and
the client device further comprises a non-transitory computer readable medium having recorded thereon statements and instructions that, when executed by the processor, configures the processor as the training circuitry.

* * * * *